June 2, 1959  J. A. DUFFY, JR., ET AL  2,888,821
APPARATUS FOR QUICK RELEASE OF PRESSURE
FROM A PIEZOELECTRIC CRYSTAL
Filed Aug. 17, 1956  2 Sheets-Sheet 1

INVENTORS
JOSEPH M. BROWN
JOHN A. DUFFY, JR.
GEORGE P. CATRAMBONE
BY
ATTORNEYS

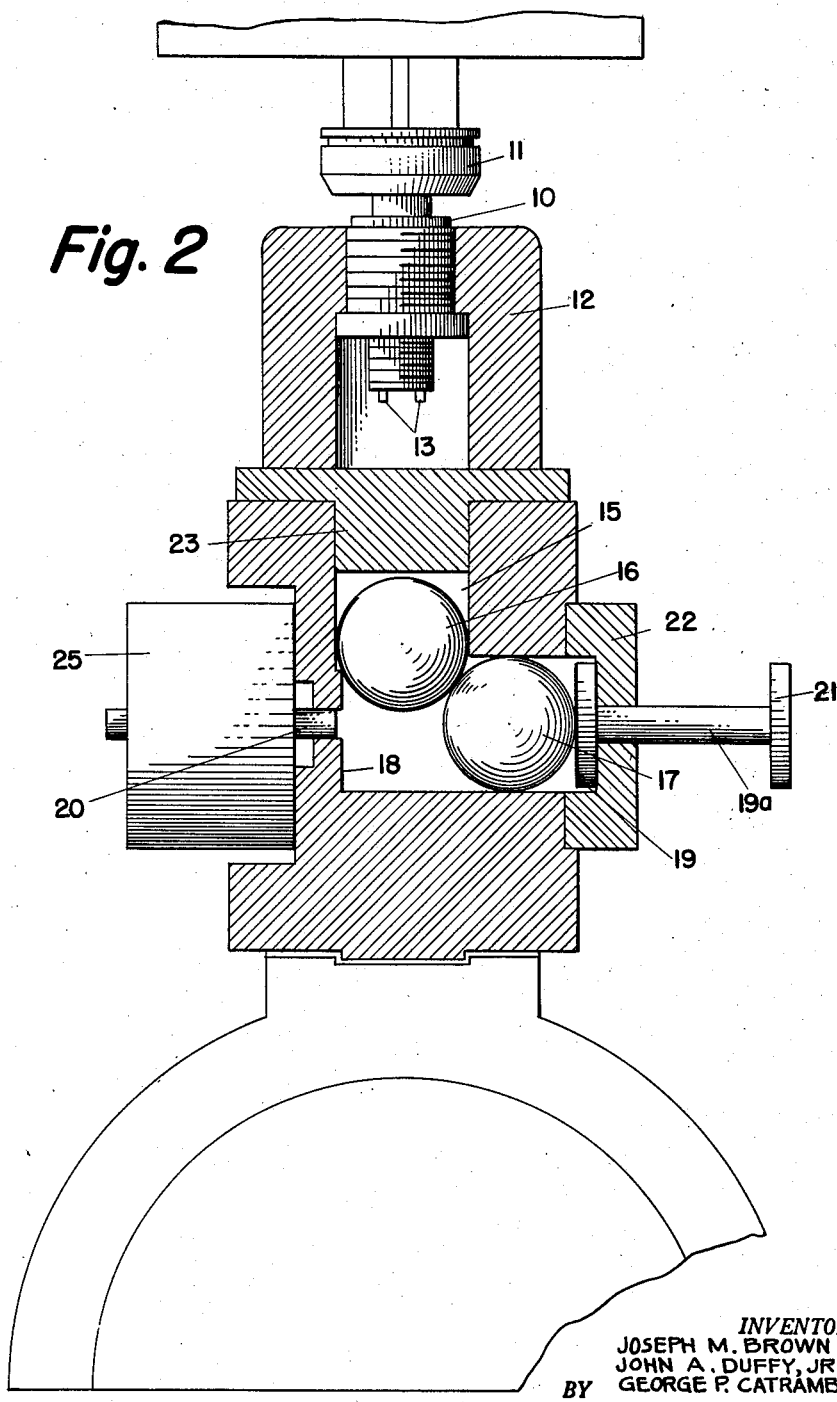

2,888,821
APPARATUS FOR QUICK RELEASE OF PRESSURE FROM A PIEZOELECTRIC CRYSTAL

John A. Duffy, Jr., Southampton, and Joseph M. Brown and George P. Catrambone, Philadelphia, Pa.

Application August 17, 1956, Serial No. 604,853

9 Claims. (Cl. 73—4)

(Granted under Title 35, U.S. Code (1952), sec. 266)

The invention described herein may be manufactured and used by or for the Government for governmental purposes without payment of any royalty thereon.

This invention relates to apparatus for the sudden release of pressure from a piezoelectric crystal, and has for an object to shorten the period of time during which pressure is being released.

In the use of the piezoelectric crystal for measuring pressures applied suddenly, an accurate calibration of the crystal is needed. Heretofore, the release of pressure from a crystal used in the measurement of pressure within a gun has been slow and nowhere nearly as rapid as is the build-up of pressure on firing the gun. Better and more nearly accurate results are obtainable in calibration of the apparatus for testing the pressure measurements in a gun when the rate of pressure release approaches the rate of pressure build-up in a gun. The pressure release mechanisms found in electric switches and elsewhere have not been useful in solving the problem presented here because the pressures applied to the crystal are much larger than those met with in electric switches and acquire a different type release mechanism.

According to this invention, pressure on the crystal has been released in as short a time as 3 milliseconds whereas heretofore 100 milliseconds were required due to the inertia of a lever, cam, and other moving parts. Specifically, this quicker release is accomplished by having the release of pressure follow the thrusting aside of a lower one of two polished steel balls, located one on top of the other, which are slightly displaced laterally and through which the pressure is transmitted.

Referring to the drawing:

Fig. 2 is a view corresponding to Fig. 1 but with the balls displaced after release of pressure.

Figure 1:
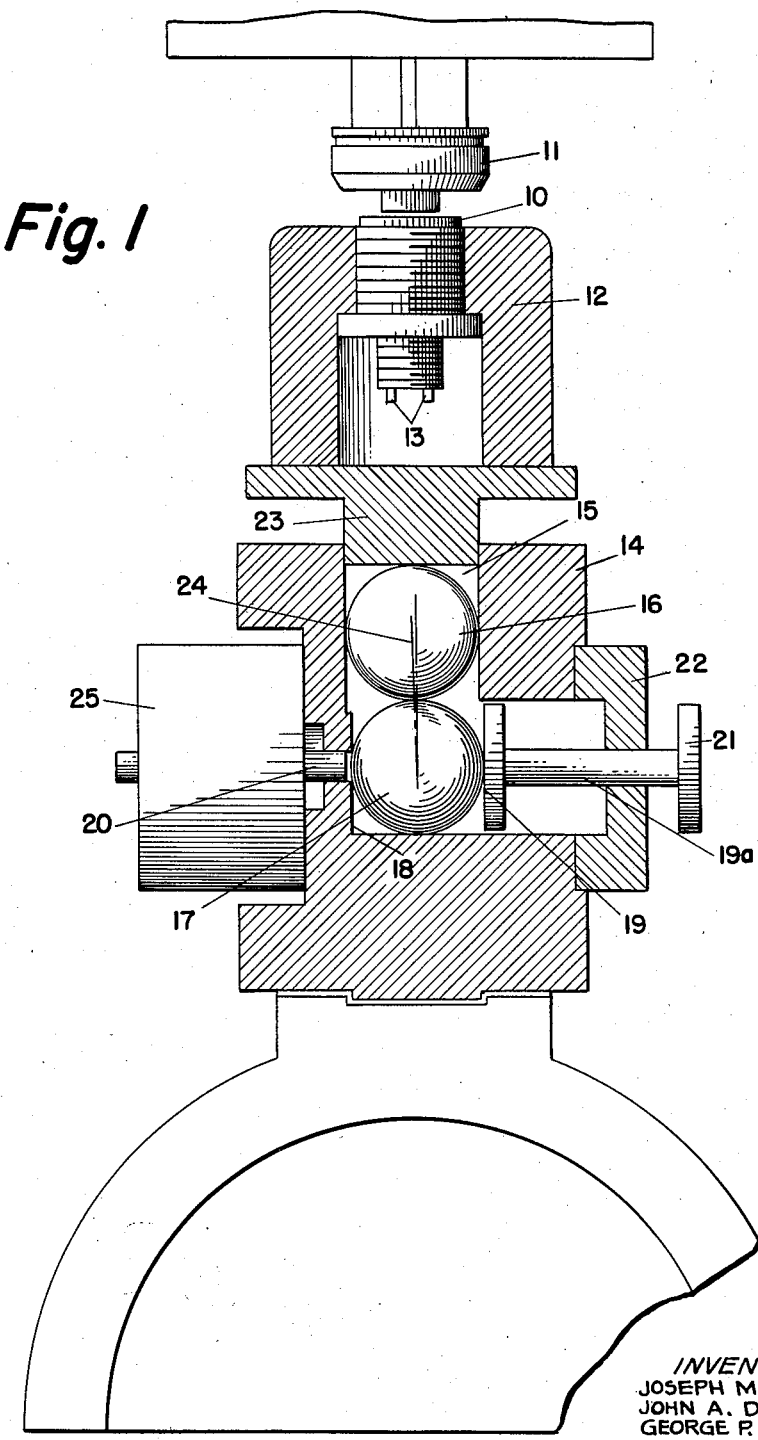
Fig. 1 is a longitudinal section through a preferred embodiment of this invention before pressure is applied to a holder for the crystal.

A gage or holder 10 for the piezoelectric crystal is shown in Fig. 1 as having some load applying means 11 for applying pressure to the crystal. A jig 12 supports the holder 10. To conduct the charge off the crystal, conductor leads are attached to the terminals 13. Pressure on the crystal in excess of 1000 pounds per square inch is applied to two hardened steel balls within the housing 14 for the pressure release mechanism. This housing comprises a guideway 15 for an upper ball 16, and a guideway for the lower ball 17 having a wall 18 which is laterally displaced .045 inch ±.001 inch from alignment with the wall of the guideway for the upper ball. Opposite the wall 18 is a yieldable wall 19 at the end of a plunger 19a shown. Movable through the wall 18 is a plunger 20 actuated by a solenoid 25 and capable of giving a very heavy impact of about 1 ton to the lower ball, pushing it to one side, and causing the wall 19 to yield. There is very little friction in movement in the yieldable wall 19, in fact a pressure as low as about one ounce, or about .0001 that on the top ball, is sufficient to cause the wall 19 to yield outwardy.

After release of pressure the upper ball 16 has been moved downward at least about one-quarter inch and the lower ball 17 has been moved to the right as shown in Fig. 2. A handle 21 is placed outside the backplate 22 for the purpose of returning the lower ball 17 to its former position. The backplate 22 constitutes a closure for the lower ball guideway which is laterally directed with respect to the vertical guideway 15 for the upper ball. The load bushing 23 has a sliding fit within the guideway 15. In practice one-inch balls were used but other diameters of balls may be appropriate so long as the sine of the angle between their centers and a vertical is substantially that found to be critical in the present instance. This angle 24 is such that its sine is substantially $$\frac{.045}{1}$$

or about 35 minutes.

In operation, on closing the solenoid circuit, the plunger 20 pushes the ball 17 to the right under a heavy thrust and the upper ball drops quickly. In fact, the upper ball has a clockwise rotation as viewed in Fig. 1 while the lower ball 17 has a counterclockwise motion due to the lowering of the upper ball and the rotation of one upon the other. Oil or other lubricants on the surface of the balls does not facilitate rapidity of pressure release as might be expected. Instead, such a lubricant seems to tend to slow up and cause the balls to stick together. If the balls had their centers in exact vertical alignment, the pressure needed would be so enormous that it would be impossible for the plunger 20 to push the lower ball to one side. It has been found that the slight lateral offset for the center of the lower ball is needed and that this degree of offset is fairly critical for best results.

Among the advantages of this invention may be mentioned the reduction in time for release of pressure and the fact that now with this quick release mechanism, pressure release occurs in substantially the same time as is required for the pressure build-up of the gun in operation. Having the time of pressure release and the time of pressure build-up substantially equal contributes to accuracy in calibration of the piezoelectric crystal. The charges given off by such a crystal depend on the time of pressure build-up and time of pressure release, but such charges are not proportional to the times of release and build-up. Having both the time and rate of pressure change on the crystal during its calibration about the same as the time and rate of pressure build up in a gun, signifies the desirability of the magnitude of pressure during calibration of the crystal being adjacent that existing in a gun in which the pressure is to be measured.

We claim:

1. In an apparatus for applying pressure to a piezoelectric crystal and releasing the same including a holder for said crystal, a support therefor, means for applying pressure to said crystal, and means for releasing pressure on said crystal, the combination therewith of the improvement for quickly releasing pressure on said crystal, said improvement comprising within said support for said crystal a housing, a guideway within said housing within which at least a portion of the crystal support is slidable, and within said housing at least a pair of polished steel balls one mounted on top of the other but displaced laterally, pressure on said crystal being applied to the top one of said balls, and means for pushing the lower ball to one side and thereby releasing pressure on said crystal.

2. An apparatus according to claim 1 in which the angle between the vertical and a line between the centers of said balls while the crystal is stressed being about 35 minutes.

3. An apparatus according to claim 2 in which said means for pushing one of said balls to one side includes a plunger and electromagnetic means for actuating said plunger.

4. An apparatus according to claim 3 in which the lower ball is allowed to move laterally with downward movement of the upper ball an amount to permit downward movement of the crystal holder at least about a quarter of an inch.

5. An apparatus according to claim 4 having a second plunger substantially opposite to the first mentioned plunger for returning the lower ball to its former position beneath the upper ball.

6. In a pressure release mechanism including a pressure applying means, a support for an object under pressure, and means for quickly releasing pressure on said object, the combination therewith of the improvement in said pressure releasing means whereby the release of pressure is rapid, said improvement comprising a pair of polished balls contiguous one another, a guideway for the ball to which pressure is applied, said guideway having an axis extending in the direction of the applied pressure, a guideway for the second ball having an axis laterally displaced from the axis of first guideway, said second guideway having a yieldable lateral wall, a plunger opposite said yieldable wall and by means of which said second ball may be thrust aside releasing pressure on the first ball, and means for actuating said plunger forcefully enough to release the pressure on said balls, the sine of the angle between the vertical and a line connecting the centers of said balls when under pressure being about .045, and the size of said balls being sufficient to enable the first ball to move along its guideway far enough to greatly reduce the pressure on it.

7. Apparatus according to claim 6 in which said balls are of steel, and in which said yieldable wall is movable under a pressure of less than about .001 that on the first ball.

8. Apparatus according to claim 7 in which said yieldable wall is movable under a pressure of less than about .0001 that on the first ball and in which an extension from said yieldable wall projects outside said guideway to constitute a return plunger by means of which said balls may be returned to their initial pressure transmitting position.

9. In an apparatus for quickly releasing pressure on a piezoelectric crystal, said apparatus including means for applying pressure in excess of 1000 pounds per square inch to said crystal, and means for releasing pressure from said crystal, the combination therewith of the improvement for effecting a quick release of pressure from said crystal, said improvement comprising a pair of polished steel balls arranged in a guideway one above the other and one slightly offset laterally from a vertical axis through the other, and a plunger by means of which the lower one of said balls may be kicked out from under the upper ball allowing the upper ball to be pushed downward releasing a substantial amount of pressure on said crystal, the angle between the vertical and a line through the centers of said balls being about 35 minutes.

References Cited in the file of this patent
UNITED STATES PATENTS

| | | |
|---|---|---|
| 2,574,475 | Grogan | Nov. 13, 1951 |
| 2,696,105 | Mackas | Dec. 7, 1954 |